Patented May 15, 1934

1,958,924

UNITED STATES PATENT OFFICE 1,958,924

METHOD OF VULCANIZING RUBBER AND THE LIKE

William A. Moore, Akron, Ohio, assignor to The Rubber Service Laboratories Co., Akron, Ohio, a corporation of Ohio No Drawing. Application November 12, 1928, Serial No. 318,991

16 Claims. (Cl. 18—53)

The present invention relates to improvements in the method of manufacturing vulcanized rubber articles and has for its object the provision of an improved vulcanizing process whereby a more perfect curing of the rubber may be effected in a comparatively short period of time and at a relatively low temperature. By operating in the manner as hereinafter disclosed, so-called ultra accelerators, that is accelerators that are particularly rapid in action, may be employed in such a manner that all danger of premature vulcanizing of a rubber stock is completely avoided.

The process in its broadest aspects comprises the curing of a rubber stock containing all the desired compounding ingredients with the exception of the vulcanization accelerator, by the heating of the stock in water containing a dispersion and preferably a stabilized emulsion of the desired accelerator. Preferably the accelerator employed should be substantially water insoluble but readily soluble in rubber in order that rapid penetration and dispersion of the accelerator in the stock may be effected.

The process is applicable as a method of vulcanizing or curing molded goods or rubber articles manufactured by the so-called dipped goods process as well as to the curing in a continuous manner of rubber stocks died out or extruded from a tubing machine such as channel rubber, insulated wire, rubber hose and the like. The process is likewise applicable to the curing of rubber coated fabric, wherein a rubber and sulfur-containing composition is calendered or spread in the well known manner upon a fabric or other foundation material and the rubber coated material is then passed in a substantially continuous manner through the bath containing the vulcanization accelerating means. Other adaptations of the process will be apparent from the following description and examples.

An emulsion was prepared by thoroughly incorporating together, while stirring and with the application of heat if desired, a mixture comprising 10 parts of a substantially water insoluble ultra accelerator, 1 to 5 parts of a water soluble jell-forming material, and sufficient water to make a total volume of approximately 1000 parts of the completed emulsion. More specifically, one such emulsion comprised 10 parts of the carbon bisulfid derivative of the reaction product of piperidine and formaldehyde, one part of oleic acid, 0.2 part of sodium hydroxide, incorporated in sufficient water to make a total volume of approximately 1000 parts of the emulsion. The rubber goods shaped or prepared in the manner hereinbefore described, were then vulcanized by immersion in the stabilized emulsion which was heated approximately at a temperature of from 200 to 210° F. for a period of time necessary to cure the rubber product.

For example, dipped goods were prepared from a rubber cement comprising

|  | Parts |
| --- | --- |
| Pale crepe rubber | 100 |
| Superfine zinc oxide | 2 |
| Sulfur | 2 | mixed in the usual manner and suspended in sufficient solvent or carrier liquid to obtain a cement of the proper consistency. These goods were found to be vulcanized after approximately five minutes' immersion in the hereinbefore described emulsion maintained at from 200 to 210° F. Any desired dye or coloring means may be added to the cement in case a colored rubber article is desired.

The invention is also applicable to the vulcanization of rubber stocks containing reclaimed or shoddy rubber. For example, dipped goods were prepared from a rubber cement containing

|  | Parts |
| --- | --- |
| Pale crepe rubber | 50 |
| Shoddy stock | 50 |
| Zinc oxide | 3 |
| Sulfur | 2½ | and a sufficient quantity of solvent necessary to make a cement of the desired consistency. These dipped goods were then found to vulcanize in from five to ten minutes, depending upon thickness of the article, when placed in the above described emulsion maintained at about 200 to 210° F.

As another example of employing the preferred process, a rubber stock was compounded suitable for use in body insulation. This stock comprised

|  | Parts |
| --- | --- |
| Shoe reclaimed rubber | 60 |
| Mineral rubber | 17 |
| Zinc oxide | 2 |
| A mixture of blended mineral and vegetable oil | 1 |
| Clay | 20 |
| Sulfur | 1 |

This material tubed out in a cylindrical form having an outside diameter approximating ⅜ of an inch, the side walls of which had a thickness of approximately 1/16 of an inch, was immersed in an emulsion containing approximately 1% by weight of the carbon bisulfid derivative of the reaction product of piperidine and formaldehyde, using an aqueous solution of sodium oleate as the protective colloid. Vulcanization of this stock was effected in 20 minutes' heating at from 200 to 210°.

Other proportions of the accelerator than those particularly described in the examples may be employed. The proportion of the accelerator required depends on several factors, for example, on the thickness of the rubber article to be vulcanized, the time of heating desired and also, in the case of dipped goods, on the type of mold employed (porcelain, aluminum and so forth). If a mold is employed which conducts heat slowly, more accelerator must be used to produce a cure within a certain period of time than is the case where a mold is employed which conducts heat more readily.

Moreover, the invention is not limited to the employment of the particular accelerator hereinbefore mentioned. Any accelerator may be employed in the process described that is sufficiently rapid in its action and is substantially water insoluble but preferably soluble in rubber in order to obtain the maximum migration of the accelerator in the rubber. Thus, the carbon bisulfid derivatives of the reaction product of an aliphatic aldehyde with pyrollidine, alkyl derivatives of piperidine such as alpha or beta alkyl piperidines, the dialkylamines such as diethylamine and the like, and dibenzylamine may be employed in a manner similar to that set forth for the carbon bisulfid derivative of the reaction product of piperidine and formaldehyde. Semi-ultra accelerators may also be employed in the process as herein set forth although the use of such accelerators would require a longer curing period or a greater proportion of the accelerator than is necessary in the case of an ultra accelerator.

Furthermore, other water soluble protective colloids than sodium oleate may be employed for stabilizing the emulsion. Thus, the sodium and potassium salts of other fatty acids, for example stearic and palmitic acids, gum arabic, soluble starch, saponin, and the triethanolamine and piperazine salts of the higher fatty acids, for example oleic, stearic and palmitic acids have been found to be desirable for use as protective colloids in the stabilization of emulsions of water insoluble accelerators. On immersing strips of compounded rubber .04 of an inch in thickness comprising

| | Parts |
|---|---|
| Pale crepe rubber | 100 |
| Zinc oxide | 5 |
| Sulfur | 2 |
| Red oxide of iron | .25 | in an aqueous emulsion of an ultra accelerator, for example the carbon disulfid derivative of the reaction product of piperidine and formaldehyde, stabilized by any of the above mentioned protective colloids, vulcanization was effected in from 10 to 20 minutes at substantially 200 to 210° F.

The herein described process may also be employed with rubber latex in place of the more commonly employed coagulated materials. Thus rubber latex which may or may not be concentrated is compounded in the usual manner with the usual vulcanization ingredients, with the exception of the accelerator. If the cement is to be employed in the preparation of dipped rubber goods, the forms are immersed in the latex cement so formed, dried in the usual manner, and then placed in the emulsion of the desired accelerator, whereupon vulcanization takes place on heating.

Having thus described the invention what is claimed is:

1. The method of producing vulcanized rubber which comprises heating a rubber-sulfur mix in water containing a stabilized emulsion of the carbon bisulfid derivative of the reaction product of a secondary aliphatic amine and an aliphatic aldehyde.

2. The method of producing vulcanized rubber which comprises heating a rubber-sulfur mix in water containing a stabilized emulsion of the carbon bisulfid derivative of the reaction product of piperidine and an aliphatic aldehyde.

3. The method of producing vulcanized rubber which comprises heating a rubber-sulfur mix in water containing a stabilized emulsion of the carbon bisulfid derivative of the reaction product of piperidine and formaldehyde.

4. The method of producing vulcanized rubber which comprises heating a rubber-sulfur mix in water containing a stabilized emulsion of the carbon bisulfid derivative of the reaction product of a heterocyclic amine and an aliphatic straight chain aldehyde.

5. The method of forming and vulcanizing dipped rubber goods which comprises preparing a rubber cement containing rubber and sulfur, applying said cement to the forms and finally vulcanizing by heating the articles so formed in water containing a stabilized emulsion of an ultra accelerator.

6. The method of forming and vulcanizing dipped rubber goods which comprises preparing a rubber cement containing rubber and sulfur, applying said cement to the forms and finally vulcanizing by heating the articles so formed in water containing an emulsion of the carbon bisulfid derivative of the reaction product of a secondary aliphatic amine and an aliphatic straight chain aldehyde stabilized by a soap.

7. The method of forming and vulcanizing dipped rubber goods which comprises preparing a rubber cement containing rubber and sulfur, applying said cement to the forms and finally vulcanizing by heating the articles so formed in water containing an emulsion of the carbon bisulfid derivative of the reaction product of piperidine and formaldehyde stabilized by sodium oleate.

8. A vulcanizing bath comprising an emulsion of the carbon bisulfid derivative of the reaction product of a secondary aliphatic amine with an aliphatic straight chain aldehyde, stabilized by a soluble colloid.

9. A vulcanizing bath comprising an emulsion of the carbon bisulfid derivative of the reaction product of piperidine and formaldehyde, stabilized in water by means of a soap.

10. A vulcanizing bath comprising an emulsion of the carbon bisulfid derivative of the reaction product of piperidine and formaldehyde, stabilized by sodium oleate.

11. The process of curing rubber goods which comprises forcing a plasticized rubber composition containing rubber and sulfur from a forming means, and passing said composition in a substantially continuous manner through a heated bath containing an emulsion of a substantially water insoluble vulcanization ultra accelerator.

12. The process of curing rubber goods which comprises forcing a plasticized rubber composition containing rubber and sulfur from a forming means, and passing said composition in a substantially continuous manner through a heated bath containing an emulsion of the carbon bisulfid derivative of the reaction product of piperidine and formaldehyde stabilized by means of a soap.

13. In the process of curing rubber goods, the steps in combination comprising forcing a plasticized accelerator free rubber composition containing rubber and sulfur from a forming means, and passing said composition in a substantially continuous manner through a heated bath containing an emulsion of a substantially water insoluble vulcanization ultra accelerator.

14. A new accelerating product comprising an emulsion of the carbon disulfide derivative of the reaction product of a secondary aliphatic amine with an aliphatic straight chain aldehyde, stabilized by means of a soap.

15. A new accelerating product comprising an emulsion of the carbon disulfide derivative of the reaction product of piperidine and formaldehyde stabilized by means of a soap.

16. A new article of manufacture comprising a stabilized emulsion of the carbon disulfide derivative of the reaction product of piperidine and formaldehyde.

WILLIAM A. MOORE.